Dec. 23, 1958  K. C. BURN  2,866,128
CATHODE-RAY DISPLAY APPARATUS
Filed May 28, 1957

Inventor
KENNETH COLLETT BURN
By
Cameron, Kerkam & Sutton
Attorneys

2,866,128
CATHODE-RAY DISPLAY APPARATUS

Kenneth Collett Burn, Rusholme, Manchester, England, assignor to Ferranti, Limited, Hollinwood, Lancashire, England, a company of Great Britain and Northern Ireland Application May 28, 1957, Serial No. 662,212

Claims priority, application Great Britain June 1, 1956

5 Claims. (Cl. 315—21)

This invention relates to cathode-ray display apparatus of the kind including a cathode-ray (CR) tube having line and frame scanning stages for producing a rectangular raster.

It is sometimes desirable for the lines of a CR tube raster to be located at the same positions on the tube screen for each frame scan, to a high degree of accuracy. This is required, for example, where the apparatus is used for "reading" information from punched cards, it being necessary that the lines scanned on the tube screen should always be in register with rows of holes representing information on the cards. Another application is for a colour television receiver where the scan lines are arranged to coincide with lines on the screen of fluorescent powder of different colour for successive lines.

To obtain sufficient accuracy merely by stabilising the frame deflection signal as applied to the deflecting electrodes or coils is particularly difficult owing to the fact that any errors at the point of deflection are greatly magnified at the screen because of the length of the beam.

An object of the invention is to provide cathode-ray display apparatus of the kind referred to, which is such that in operation the lines of the scan occupy the same position on the tube screen for each frame scan, to a high degree of accuracy.

In accordance with the present invention, cathode-ray display apparatus includes a cathode-ray tube having line and frame scanning stages for producing a rectangular raster on the screen of the tube, and frame-scan control means for causing each frame scan to be effected in unidirectional fractional displacements of the beam from line to line of the raster, pausing at each line, under the control of pulses derived from impingement of the beam on means within the tube defining the position of each line at one side of the raster.

Said means within the tube may include means for deriving an initiating pulse near the end of each line scan or line flyback, and means for deriving a terminating pulse when the beam reaches the next line of the raster, said frame-scan control means being such that each initiating pulse causes the frame scanning stage to initiate a said fractional displacement of the beam towards the position on the screen of the next line of the raster, and the subsequent terminating pulse causes the beam to remain on the line so reached for the ensuing line scan and line flyback, or line flyback and line scan, as the case may be.

Also in accordance with the invention there is provided for use as a part of the apparatus as set forth in either of the two preceding paragraphs a cathode-ray tube having within the tube for deriving said pulses a comb-shaped electrode located on the screen along the predetermined position of said side of the raster, the said electrode having for each line of the raster a tooth aligned with the predetermined position of that line, said tooth pointing along that line and to some extent overlapping it.

In the accompanying drawings.

Figure 1:
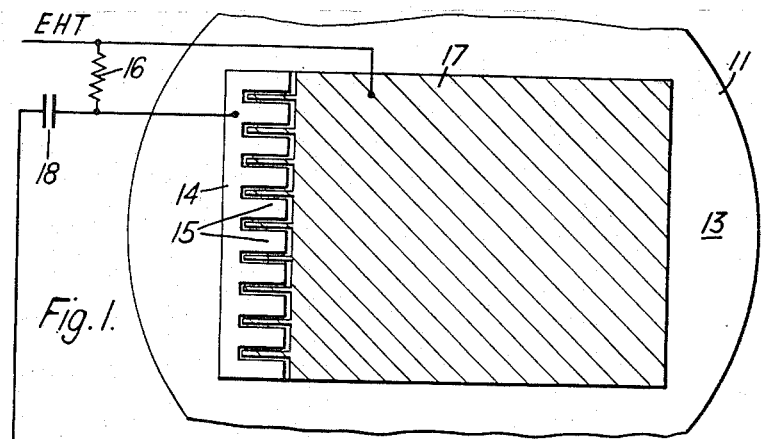
Figure 1 is a schematic diagram of one embodiment of the invention.

In carrying out the invention in accordance with one form by way of example, cathode-ray display apparatus includes a CR tube 11 (see Fig. 1) together with a frame scanning stage 12 and a line scanning stage (not shown) for producing a rectangular raster on the screen 13 of the tube. Within the tube, located so as to lie along that side of the raster from which each line scan starts, is an electrode 14 of conductive material shaped like a comb and hereinafter referred to for convenience as such. The comb has sharp parallel-sided teeth 15, one for each line of the raster; the thickness of the teeth as depicted in the drawings has been much exaggerated for clarity. Each tooth is aligned with the required position of that line on the screen and points along and slightly overlaps the line. There are thus the same number of teeth as there are lines and the teeth define the predetermined positions of the ends of the lines along the side of the raster from which each line scan starts.

The comb is connected through a resistor 16 to the conductive coating 17 of the screen, which coating is as usual connected to the positive pole of the EHT supply. A connection from the comb is taken by way of a blocking capacitor 18 to the frame scanning stage 12 by way of frame-scan control means 19. The latter includes in turn an amplifier 20, a pulse shaper 21, and a bi-stable device 22. The output from the device is applied to frame-scanning stage 12, which supplies the frame scan signals over a lead 23 to the frame scan electrodes (not shown) of the tube. The stable states of the device will for convenience be referred to as the first state and the second state; the connections are so made from the device to stage 12 that when the device is in its second state the frame scan is in operation, steadily displacing the beam in the usual direction for such a scan, whereas when the device is in its first state the beam is maintained on the line of the raster reached at the end of the frame displacement occurring whilst the device was in its preceding second state.

In feedback association with device 22 is a time switch 24 to limit the duration of each second stable state to some value less than the duration of each line scan, for a reason hereinafter indicated.

Figure 2:
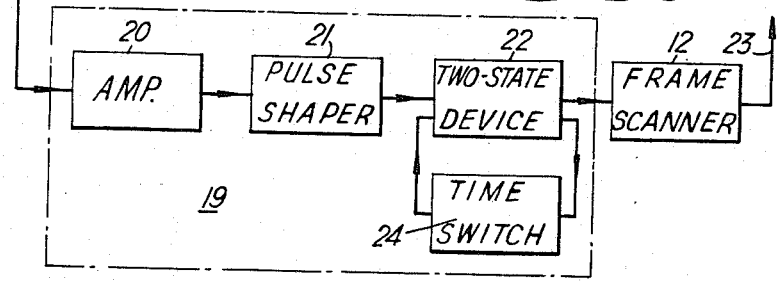
Figure 2 shows a part of the apparatus of Figure 1 to an enlarged scale to illustrate the operation.

The operation of the apparatus will now be described in detail, with additional reference to Fig. 2, in which the conductive coating 17 is omitted to clarify the drawing.

It will be assumed that to begin with the beam is about to start a line scan from a tooth $15^1$ (see Fig. 2) of the comb 14, device 22 being in its first stable state with the frame scan field having the value appropriate to the position of this line in the raster.

During this line scan the frame scan field remains constant at the value stated. A straight line 25, normal to the direction of the frame scan, is thus traced across the screen. The frame scan field still remains constant at this value during the flyback, with the result that the beam returns along the line just traced (a slightly separate line 26 is depicted for clarity) till it arrives back at tooth $15^1$ from which that line started.

The impingement of the beam on this tooth near the end of the flyback causes an initiating pulse to be delivered to frame-scan control means 19, where it triggers device 22 to its second stable state and so initiates a fractional displacement of the beam by the frame scan field towards the position on the screen of the next line of the raster. The resulting movement of the beam, indicated by the line 27, is the resultant of this fractional displacement and the remaining part of the deflection of the line flyback.

This resultant movement carries the beam to the next tooth $15^{11}$ of the comb in the direction of the frame scan.

The impingement of the beam on tooth $15^{11}$ causes a terminating pulse to be delivered to control means 19. This pulse triggers device 22 back to its first state and so terminates the fractional frame scan, as described above, leaving the beam on the next line of the raster, as defined by tooth $15^{11}$. The ensuing line scan starts from this tooth, the frame scan field remaining constant at its new value throughout this line scan and throughout all but the end part of the ensuing line flyback.

In brief, alternate pulses, derived from the comb, switch on the frame scan to displace the beam, whereas the intermediate pulses switch off the frame scan from displacing the beam further, leaving the beam in the position of frame deflection thus reached until the next pulse is derived. The frame scan is thus effected in unidirectional fractional displacements from line to line of the raster, pausing at each line.

Figure 3:
Figure 3 shows the part of Figure 2 under an alternative system of operation.

The movement of the beam from one tooth to the next is shown as occurring at the end of the flyback, as indicated by the line 27. By reducing the extent to which the teeth of the comb overlap the lines of the raster, this movement might alternatively be arranged to occur, as shown at $27^1$ in Fig. 3, partly during the end of the flyback and partly during the start of the next line scan. The essential requirement is that the teeth should overlap the lines sufficiently to ensure that the beam engages the next tooth before the ensuing line scan carries the beam beyond the range of the teeth. An overlap sufficient for this purpose need not in practice appreciably reduce the information content of the display. This is particularly so in the case of the BBC television transmissions; here the initial portion of each line scan is entirely devoid of signal information, and a tooth overlap restricted to this portion is amply sufficient for the purpose of the invention.

The above sequence is repeated to the end of the frame; whereupon the frame flyback carries the beam to the tooth which defines the start of the first line of the raster, and the whole process is repeated.

Time switch 24 is provided in order to prevent the apparatus starting "out of step"—that is, switching on the frame scan where it should be switched off or vice versa. The switch limits the duration of each displacement of the beam by the frame scanning stage to less than the duration of a line scan. This is effected by causing the switch to be rendered active when device 22 is triggered to its second state and to apply an input to device 22 to trigger it back to its first state after the second state has lasted about 10% longer than the time needed for the beam to pass from one tooth to the next. Hence if the apparatus starts out of step it corrects itself before the first line scan has been completed. Where of course the second state is terminated, as in normal operation, by the impingement of the beam on the next tooth of the comb, the time switch exercises no control. Nor is the switch active whilst the two-state device is in its first state.

The comb may alternatively be placed at the other side of the screen so that each fractional displacement of the frame scan is initiated near the end of a line scan instead of near the end of a line flyback.

Figure 4:
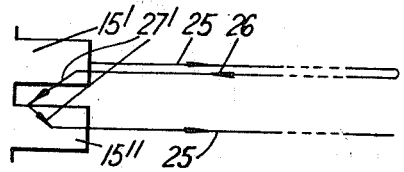
Figure 4 shows a part of the apparatus similar to that of Figures 2 and 3 but modified in accordance with another embodiment.

Such an arrangement is shown in Fig. 4. Each line flyback 126 is thus coincident with the ensuing line scan 125 (again shown separate for clarity) rather than with the preceding line scan as described with reference to Fig. 2. In this arrangement the movement of the beam to the next tooth is shown as taking place during the end 127 of the line scan; but it might alternatively occur partly during the end of the line scan and partly during the start of the next line flyback.

Where the comb is in this alternative position the rest of the apparatus may be as already described with reference to Fig. 1.

The frame and line scans may be achieved by either magnetic or electrostatic methods. The most practicable arrangement is to use magnetic deflection for the frame.

It will readily be appreciated that with the apparatus of the invention the lines are kept consistently in the same positions on the screen by the teeth of the comb. Provided the teeth are sharp enough, which can readily be attained in practice, the consistency of line position has a high degree of accuracy. The line positions are thus independent of valve characteristics and are quite unaltered by drift of those characteristics during valve life.

What I claim is:

1. Cathode-ray display apparatus including a cathode-ray tube, having line and frame scanning stages for producing a rectangular raster on the screen of the tube, and frame-scan control means for causing each frame scan to be effected in unidirectional fractional displacements of the beam from line to line of the raster, pausing at each line, under the control of pulses derived from impingement of the beam on means within the tube defining the position of each line at one side of the raster.

2. Apparatus as claimed in claim 1 wherein said means within the tube includes means for deriving an initiating pulse near the end of each line scan or line flyback, and means for deriving a terminating pulse when the beam reaches the next line of the raster, said frame-scan control means being such that each initiating pulse causes the frame scanning stage to initiate a said fractional displacement of the beam towards the position on the screen of the next line of the raster, and the subsequent terminating pulse causes the beam to remain on the line so reached for the ensuing line scan and line flyback, or line flyback and line scan, as the case may be.

3. Apparatus as claimed in claim 2 wherein said frame-scan control means includes a bi-stable device adapted to be triggered from a first to a second stable state by each initiating pulse and restored from said second to said first stable state by each terminating pulse, and means whereby the device in its second state causes the frame scanning stage to displace the beam whereas the device in its first state causes the frame-scanning stage to maintain the beam on the line of the raster reached as the result of such displacement.

4. Apparatus as claimed in claim 3 wherein a time switch is connected to said bi-stable device so as to be active during only the second stable state and is adapted to restrict the duration of the second state to a predetermined value which is less than the duration of each line scan.

5. In cathode-ray display apparatus of the type including a cathode-ray tube having a screen on which a rectangular raster is produced by line and frame displacement of an electronic beam, frame-scan control means comprising a comb-shaped electrode located within the tube along one side of the screen and having for each line of the raster a tooth aligned with and pointing along the predetermined position of that line and partially overlapping one end of said line, and means responsive to pulses derived from impingement of the beam on said teeth for causing each frame scan to be effected in unidirectional fractional displacements of the beam from line to line of the raster, pausing at each line.

References Cited in the file of this patent

UNITED STATES PATENTS

| | | |
|---|---|---|
| 2,630,548 | Muller | Mar. 3, 1953 |
| 2,691,116 | Allwine | Oct. 5, 1954 |
| 2,728,026 | Van Overbeek | Dec. 20, 1955 |
| 2,731,582 | Cook | Jan. 17, 1956 |